United States Patent [19]

Sonderegger et al.

[11] Patent Number: 4,691,575

[45] Date of Patent: Sep. 8, 1987

[54] TRANSDUCER INSERTS; METHODS OF MAKING THEM AND SENSORS FOR MEASURING MECHANICAL VARIABLES

[75] Inventors: Hans-Conrad Sonderegger, Neftenbach; Reto Calderara, Winterthur; Alfred Wenger, Winterthur; Hans-Ulrich Baumgartner, Winterthur, all of Switzerland

[73] Assignee: Kristal Instrumente AG, Winterthur, Switzerland

[21] Appl. No.: 814,401

[22] Filed: Dec. 30, 1985

[30] Foreign Application Priority Data

Jan. 28, 1985 [EP] European Pat. Off. ........ 85100818.5

[51] Int. Cl.[4] .......................... G01L 7/08; G01L 9/06; G01L 9/12
[52] U.S. Cl. ......................................... 73/756; 29/595; 29/610 SG; 73/718; 73/721; 73/724; 73/727
[58] Field of Search ................. 73/756, 723, 717, 718, 73/719, 720, 721, 722, 724, 725, 726, 727, 728, DIG. 4; 29/610 SG, 454, 157 R, 595

[56] References Cited

U.S. PATENT DOCUMENTS

| | | | |
|---|---|---|---|
| 3,817,107 | 6/1974 | Shimada et al. ...................... | 73/727 |
| 4,196,632 | 4/1980 | Sikorra ................................... | 73/718 |
| 4,325,260 | 4/1982 | Takashi et al. ........................ | 73/726 |
| 4,424,713 | 1/1984 | Kroninger, Jr. et al. ............. | 73/718 |
| 4,498,070 | 2/1985 | Lirman ................................... | 73/726 |

Primary Examiner—Donald O. Woodiel
Attorney, Agent, or Firm—Birch, Stewart Kolasch & Birch

[57] ABSTRACT

A transducer insert for installing in sensors for measuring mechanical variables includes a semi-conductor body with a measuring diaphragm part of which has diffused-in strain-sensitive resistance paths or capacitor electrodes and also connecting contacts on one side. The semi-conductor body is connected to a base body of insulating material, preferably by an anodic method, through which electrically conductively coated channels pass. The channels open at a recess in the base body which is bridged by the measuring diaphragm part. The electrically conductive layers of the channels extend along the recess to the vicinity of the connecting contacts of the semi-conductor body and are directly connected thereto in an electrically conductive manner by the so-called corner drop method, e.g. by glueing, soldering or thermo-compression. A central projection can be provided in the recess of the base body which creates a deflection limit for the measuring diaphragm part. The transducer insert can be manufactured according to the so-called batch method.

19 Claims, 15 Drawing Figures

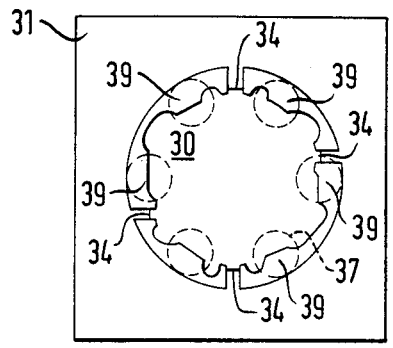
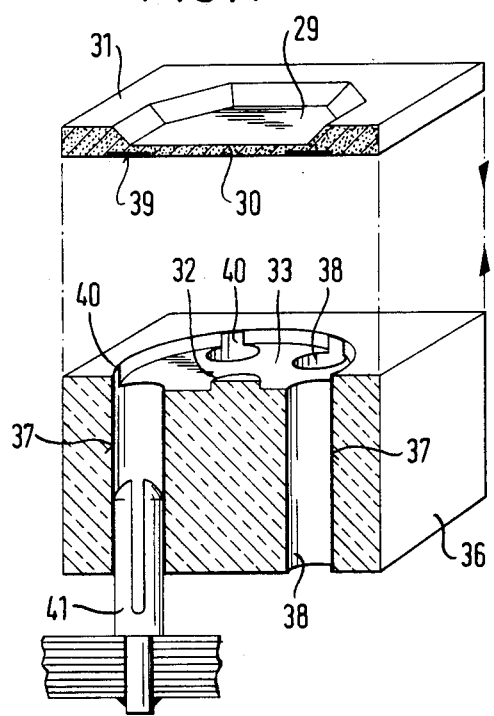
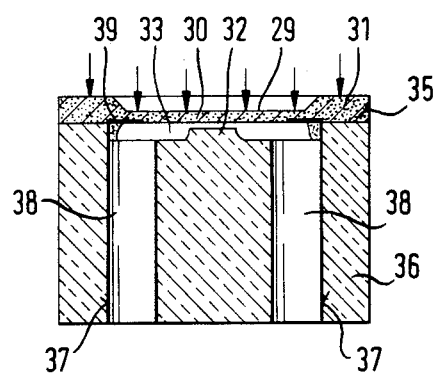
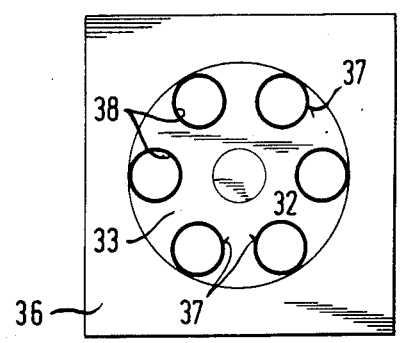

TRANSDUCER INSERTS; METHODS OF MAKING THEM AND SENSORS FOR MEASURING MECHANICAL VARIABLES

BACKGROUND OF THE INVENTION

Field of the Invention and Brief Description of Prior Art

The invention concerns a transducer insert. The invention also concerns a method for making the transducer insert and also a sensor for measuring mechanical variables using such transducer insert.

The invention generally relates to electro-mechancial sensors, where a change in force introduced from outside is transformed into a change in resistance or capacitance generating a corresponding electrical signal.

Generally speaking, there is little space available for this type of sensor at the measuring point, so that today, the use of small semi-conductor sensors having high sensitivity is preferred. This type of sensor can be exposed to difficult environmental conditions in its place of use, such as very high or low temperatures, essential temperature fluctuations, high humidity, agressive media, high and even radioactive radiation and also magnetic and electrical fields. Particular problems are caused by oscillations and shocks. The Ball-Bond and Wedge-Bond techiques using fine gold wires, as generally used in semi-conductor technology, are susceptible to faults as they follow the oscillation and shock movements, which can lead to fatigue fractures and/or breaking of these connections. Examples of such prior bonding technique are shown in FIGS. 1-3 and will be explained later.

Reference is also made to the following U.S. Pats. Nos.: 3,838,379, 3,654,579, 4,412,203, 4,454,771 which describe pressure transducers of the type employing semi-conductor devices and wire or rod-like conductor elements for carrying off the measuring signals.

European Pat. application, publication No. 0 024 946, describes a capacitance transducer and a method for its manufacture using batch-processing techniques. The transducer comprises a semi-conductor body and a glass body having electrically conductive elektrode areas forming a capacitance. A plurality of holes penetrate the glass body. The holes are coated with films of conductive material which simply contact the electrically conductive elektrode areas of the semi-conductor and glass bodies to provide electrical contact therewith. Such connections have inferior strength and are susceptible to premature fatigue when exposed to shock or vibration stresses. Another disadvantage is that the quality of the connection cannot be readily checked at the finished product.

SUMMARY OF THE INVENTION

One object of the invention is to provide a transducer insert based on a semi-conductor material, by which the problems involved with known semi-conductor sensors are eliminated. In particular, it is an object of the invention to provide a transducer insert of the type mentioned which is extensively insensitive to environmental influences, including oscillations and shocks. A further object of the invention is to provide a transducer insert of the type mentioned which can be manufactured in a particularly economical manner. It is a further object of the invention to provide a method best suited to manufacture transducer inserts of the type mentioned in large numbers. A further object of the invention is the provision of an improved semi-conductor sensor based on a transducer insert of the type mentioned.

The transducer insert according to the invention comprising a semi-conductor body having a measuring diaphragm with force responsive sensor means for generating measuring signals and connecting contacts, a base body of an insulating material to which the semi-conductor body is mounted, and electrical conductor means for carrying off the measuring signals, said conductor means comprises channels extending through said base body and provided with electrically conductive layers which are electrically connected to the connecting contacts by means of an electrically conductive material selectively applied to adjacent portions of associated electrically conductive layers and connecting contacts.

The method according to the invention for manufacturing a transducer insert of this type is characterized by the steps of:

(a) providing a plate of semi-conductor material having a plurality of measuring diaphragm portions formed therein each measuring diaphragm portion comprises a measuring diaphragm having force responsive sensor means and connecting contacts, (b) incorporating channels in a base plate of an insulating material in an arrangement and number corresponding to the connecting contacts of the diaphragm portions of the semi-conductor plate, (c) coating the channels of the base plate with an electrically conductive material, (d) connecting the semi-conductor plate to the base plate such that to each of the channels is associated a connecting contact of the diaphragm portions, (e) connecting the electrically conductive layers of the channels to the connecting contacts of the diaphragm portions by causing an electrically conductive material to adhere to adjacent portions of the conductive layers and connecting contacts, and (f) dividing the wafer arrangement comprising the base plate and the semi-conductor plate into a number of individual transducer inserts each having a diaphragm with force responsive sensor means and means for carrying off a measuring signal produced thereby.

A number of recesses can be made in the base plate, e.g. by using an etching technique, before the two plates are joined together.

In order to connect the connecting contacts to the layers, a thermo-compression tool, e.g. an ultrasonic tool, can be introduced into the channel, material is removed from the elctrically conductive layers of the channels, and the material removed is pressed to near the connecting contacts of the capacitor plates or resistance plaths, plastified and caused to adhere in an electrically conductive manner to the layers and the connecting contacts. As an alternative the connection can also be achieved by providing the electrically conductive layer on the vicinity of the connecting contacts with a soldering material and melting the soldering material by means of a soldering tool introduced into the channels and causing it to adhere to the connecting contacts. A further alternative envisages that a dispenser tool for an electrically conductive adhesive is introduced into the channels, the adhesive is applied to the neighbouring areas of the connecting contacts and electrically conductive layer and allowed to wet. A number of "active" connections i.e. connections which are placed or applied under positive control, between the electrically conductive layers and the connecting contacts can be produced in a particularly economical way and in one step, if desired, by means of multiple tools which can be introduced into the channels in the base plate.

The invention further provides a sensor having a transducer insert which comprises a semi-conductor body having a measuring diaphragm with force responsive sensor means for generating measuring signals and connecting contacts, a base body of an insulating material to which the semi-conductor body is mounted, and electrical conductor means for carrying off the measuring signals, said conductor means includes channels extending through the base body and provided with electrically conductive layers electrically connected to the connecting contacts by means of an electrically conductive material applied to adjacent portions of the electrically conductive layers and connecting contacts, the sensor comprising a housing accommodating the transducer insert and provided with a carrier plate having contact elements adapted to be inserted into the electrically conductive channels of the transducer insert.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is described in more detail below on the basis of the drawings which are given by way of illustration only, and thus are not limitative of the present invention and with prior reference to the state of the art, where

FIG. 4 is a perspective cross-section of a transducer insert according to the invention.

FIG. 5 is a cross-section of the transducer insert as shown in FIG. 4.

FIG. 6 is a top view of the base of the transducer insert as shown in FIG. 4 and FIG. 5.

FIG. 7 is a bottom view of the semi-conductor body of the transducer insert as shown in FIG. 4 and FIG. 5.

FURTHER DESCRIPTION OF THE PRIOR ART AND DESCRIPTION OF THE PREFERRED EMBODIMENTS OF THE INVENTION

Figure 1:
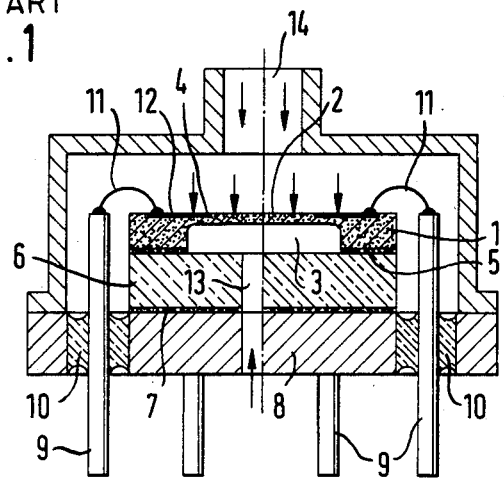
FIGS. 1–3 show different known types of semi-conductor transducer inserts.
Figure 2:
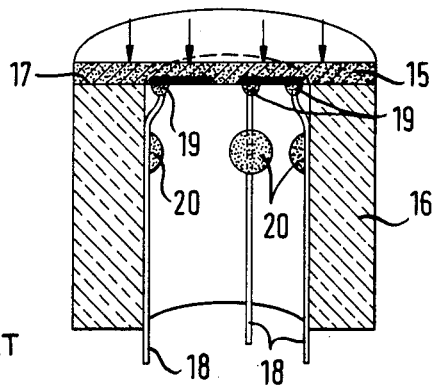
Figure 3:
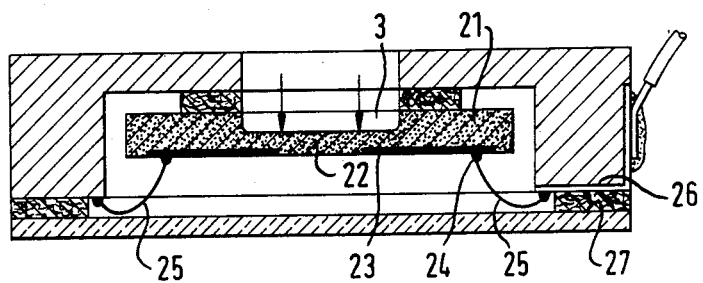

With reference to the state of the art, reference is made to FIGS. 1–3. FIG. 1 shows a known, frequently used type of a semi-conductor transducer. This includes a semi-conductor body 1 with a diagraphm part 2 which is formed by making a cavity 3 in the semi-conductor body and whose surface facing away from the caivty has sensor components, e.g. in the form of strain-sensitive electrical resistance paths 4 or capacitor plates or electrodes. Cavity 3 is usually made mechanically or by etching. Semi-conductor body 1 is soldered on a base body 6 consisting of an insulating material such as glass by means of gold solder or glass solder 5. The assembly consisting of bodies 1 and 6 is attached to a housing bottom plate 8 by means of gold solder or glass solder 7. In order to carry the measuring signal via corresponding connecting contacts or surfaces 12, resistance paths 4 or capacitor plates are connected, by means of gold wires 11, to conductors 9 which are secured in housing bottom plate 8 by means of glass insulators 10. For relative pressure measurements, the sensors can be provided with a bore 13 to transmit the relative or comparative pressure to cavity 3. The acutal measuring pressure acts on the transducer insert via a line 14 in the housing. Apart from the gold wires 11, the glass insulators 10 and also the gold solders 5 and 7 are parts liable to fail. The glass insulators 10 crack easily, whilst solders 5 and 7 often do not have the tightness against leakage necessary for absolute pressure sensors.

FIG. 2 shows another known type of semi-conductor transducer insert. In this case, semi-conductor body 15 is a plane surface lapped each side which is attached to a tubular base 16 by means of an anodic connection 17. The anodic connection 17 is perfectly tight, has a high level of strength and a very good dimensional stability as there is no intermediate connecting film and the material itself forms a connection by ion migration. The making of a cavity can be avoided by using a tube. The measuring signals are transmitted via wires 18 which are, in fact, thicker, and less fragile than the gold wires of the afore-mentioned known type, but which create production problems and have to be secures with adhesive 20.

FIG. 3 shows a third known type of transducer. In the case of the type according to FIG. 1, the pressure medium as direct access to the resistance paths 4 of the semi-conductor body, which is a disadvantage because the diffusion layers are very thin and corrosion can lead to destruction of the resistance paths. On the other hand, the semi-conductor body 21 of the embodiment according to FIG. 3 is inverted, i.e. the pressure medium acts on diaphragm 22 on the side of cavity 3 and the diffused-in resistance paths 23 are on the opposite side. Therefore, the resistances do not come into contact with the pressure medium. However, problematic gold wires 25 are used here, too, and the bushes 26 and the insulation 27 are more difficult to make than in the case of the construction according to FIG. 1.

A further disadvantage of the known types of transducer is the fact that diaphragm 2 has no limit providing for an overload protection as, for example, is described in U.S. Pat. No. 3,335,381. Deflection limits of the diaphragm represent an important addition to pressure sensors, when relatively complicated and expensive auxiliary devices have been used. As will be described below, the diaphragm deflection limit can be achieved by the invention without considerable additional expense.

Figure 15:
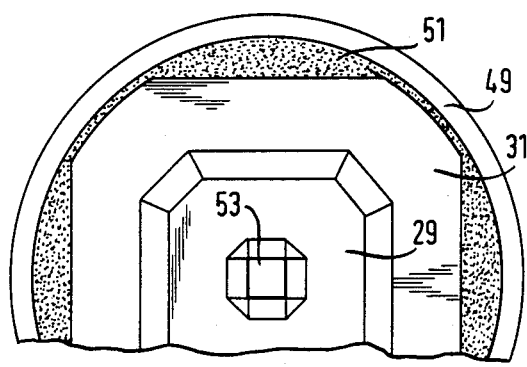
FIG. 15 is a top view of the sensor shown in FIG. 14.

An embodiment of a transducer insert according to the invention is shown in FIGS. 4 and 5. This is a transducer insert for a pressure sensor. However, it could also be used for a force sensor or acceleration sensor without a significant modification. The semi-conductor body 31 of the transducer insert according to the invention has recess 29 on one side, which forms a measuring diaphragm part 30 and which can be made by any suitable method, e.g. by etching or by mechanical removal. Recess 29 can have a polygonal or octagonal or any other suitable contour as shown in FIG. 15. Diffused-in resistance paths 34 are applied on the side of measuring diaphragm part 30 opposite to recess 29. Therefore, the resistance paths 34 are not exposed to the pressure medium. Semi-conductor body 31, which preferably consists of monocrystalline silicon, is attached to a base body 36, consisting of a suitable insulating material such as glass, preferably by means of an anodic connection 35.

According to the invention a number, e.g. six, of cylindrical channels 37 are disposed along a circle pass through base body 36. Preferably, the circle has, as its centre point, a central projection 32 on base body 36, which will be discussed in more detail later.

As can be seen from FIG. 4, base body 36 has a recess 33 on the top. On the perimeter of recess 35 the channels 37 open tangentially. This recess 33 endows measuring diaphragm part 30 with latitude of movement.

FIG. 6 is a top view of the glass base body 36 with a, for example annular, recess 33 and opening channels 37. The surface in the centre of the recess forms a stop 32 with which measuring diaphragm part 30 comes into contact under the effect of a measuring pressure resulting in excessive deflection.

According to the invention, each channel 37 has an electrically conductive layer or film 38 which is used to carry the measuring signals from resistance paths 34. The electrically conductive layers 38 reach right to the vicinity of the resistance paths 34 of semi-conductor body 31. Contact surfaces 39, which serve as connectors for the resistance paths, are provided in the vicinity of narrow extensions of layers 38 extending along recess 33 in the form of conductive tabs 40.

FIG. 7 shows semi-conductor body 31 from below, illustrating the arrangement of resistance paths 34, contact surfaces 39 and the position and arrangement, shown by dotted lines, of the channels 37 which pass through base body 36. No metal conductive surfaces may be present within recess 13 apart from conductive tabs 40.

Figure 8:
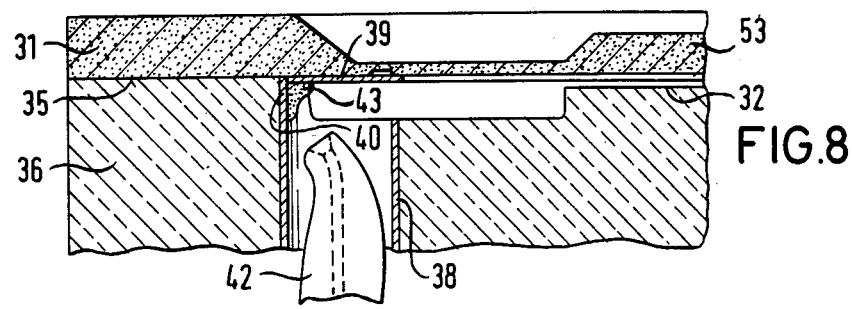
FIGS. 8 and 9 are detailed views of a modified transducer insert according to the invention to explain different methods of connecting the connecting contacts of the capacitor plates or resistance paths to the electrically conductive layers of the channels.
Figure 9:
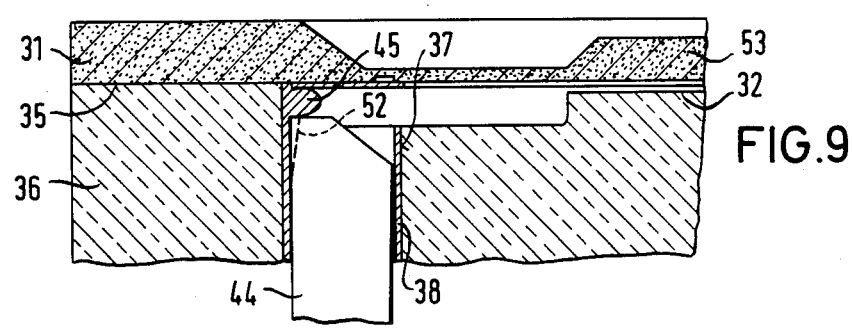

FIGS. 8 and 9 shows methods for connecting conductive tabs 40 or layers 38 to connecting contacts 39 of resistance paths 34. After a preferably anodic connection 35 has been established between semi-conductor body 31 and base body 36, a small amount of conductive adhesive 43 is injected into the essentially right angle between conductive tab 40 and corresponding contact surface 39 by means of the nozzle of a dispenser tool 42 in accordance with a preferred method of the invention, the so-called "corner drop method". The adhesive sets after some time and creates the electrical connection between conductive tab 40 and contact surface 39. A soldered or thermo-compression connection or another suitable connection can be provided at the said point instead of the afore-mentioned connection. Layer 38 or conductive tab 40 can be strengthened slightly through an deposition 52 of gold, indium or tin, for example, on a lower part of channels 37. The original contour of electro-deposition 52 is shown in FIG. 9 as a dotted line. Deposition 52 is removed and pressed into the corner by means of a ultrasonic tool and/or hot bar, which has the funtion of a sonotrode or a soldering iron 44 and which can be inserted into channels 37. Connection 45 is created by thermo-compression of the gold or melting of the soldering material. It is possible to deposit the metal electrically in a narrow area with a small surface, almost pointed anode and through the choice of a small distance from layer 38 or conductive tab 40.

Using the connection method according to the invention, all the electrical circuits are secured very firmly so that they are not affected by vibrations or shocks. The diffused-in resistance paths 34 are on the side of measuring diaphragm 30 facing away from the pressure medium and therefore cannot be affected thereby. Contrary to the known type of transducer according to FIG. 1, there are also no critical temperature-sensitive glass bushes and the soldered connections holding the semi-conductor and base body together are replaced by less critical anodic connections.

An important other advantage of the invention is the fact that when making the transducer insert, more operations can be carried out in the so-called batch process than is possible in the case of traditional constructions. In the case of the construction according to FIG. 1, only semi-conductor 1 can be made according to the batch method. The diffusing-in of resistance paths 34 and the contact surfaces and their connections, the making of the cavities and the provision of the protective silicon oxide coverings can be carried out together on many transducer units in just one operation on a wafer with a diamter of 76 mm for example. The wafer is only divided into individual units which these processes have been completed. The further manufacture of the transducer inserts then takes place by way of individual manufacture which, in particular, includes bonding, soldering, evacuating and sealing.

Figure 11:
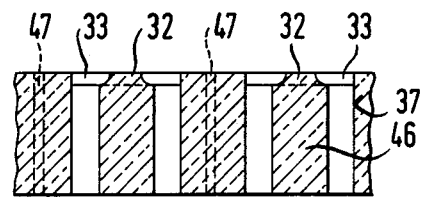
FIGS. 11 and 12 are cross-sectional top and side views of a base plate to explain the method for making a number of transducer inserts according to the invention at the same time.
Figure 12:
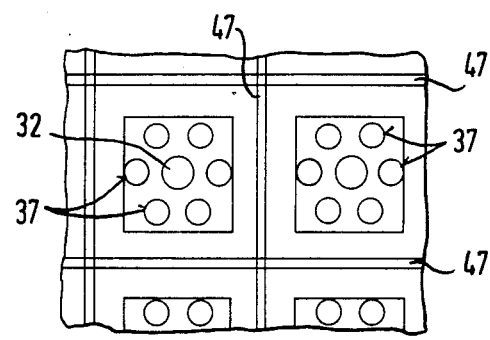

On the other hand, according to the invention, base body 36 of the transducer inserts can also be made from a base plate 46 by the batch method, as shown in FIGS. 11 and 12. In the case of 200 transducer inserts, for example, recesses 33 can be made in base plate 46 by etching in a single operation. Channels 37 for all elements can also be formed by an etching operation. All the channels can be metallised inside by means of a chemical process to create the electrically conductive layer 38 in a single operation.

Preferably, formation of recesses 33 with the central portion 32 which provides the stop for measuring diaphragm 30, takes place in two stages. For example, a two stage etching operation can be carried out as follows:

1. Photolithographic masking of all areas of the base plate to be anodically connected to the semi-conductor plage.
2. 1st etching stage to a depth d which corresponds to the maximum permissble deflection of the membrane diaphragm part,
3. photolithographic masking of stop surfaces 32,
4. 2nd etching stage to a complete depth T of recess 33,
5. removal of the etching masks.

Figure 10:
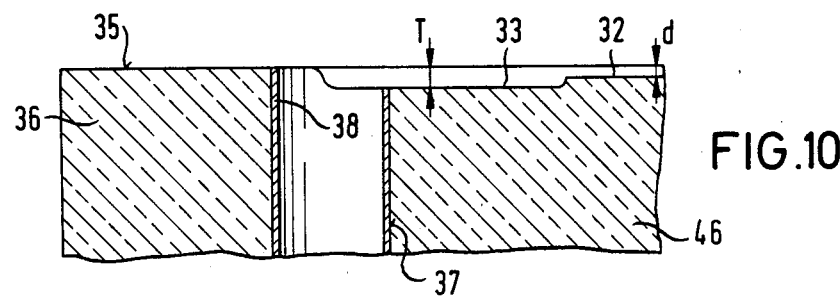
FIG. 10 is a detailed view of the base to explain the method of making recesses in the transducer inserts.

As the anodic connection between the semi-conductor plate and the base plate requires no intermediate layer, the gap between measuring diaphragm part 30 and stop 32 has exactly the envisaged distance d over the entire surface of the base plate or the semi-conductor plate 31, 46. FIG. 10 shows the form of base plate 46 before the anodic connection and before the division are made.

Finally, the base plate 46 prepared in this way is connection anodically to the semi-conductor wafer 31 and the thermo-compression connection between the resistance paths and layers 38 made by means of a multisonotrode, for example, which can be introduced into all or several channels 37 at the same time. By dividing the wafer formed along lines 47 (see FIGS. 11/12), transducer inserts are created according to FIG. 4, ready to be installed in a sensor housing.

Figure 14:
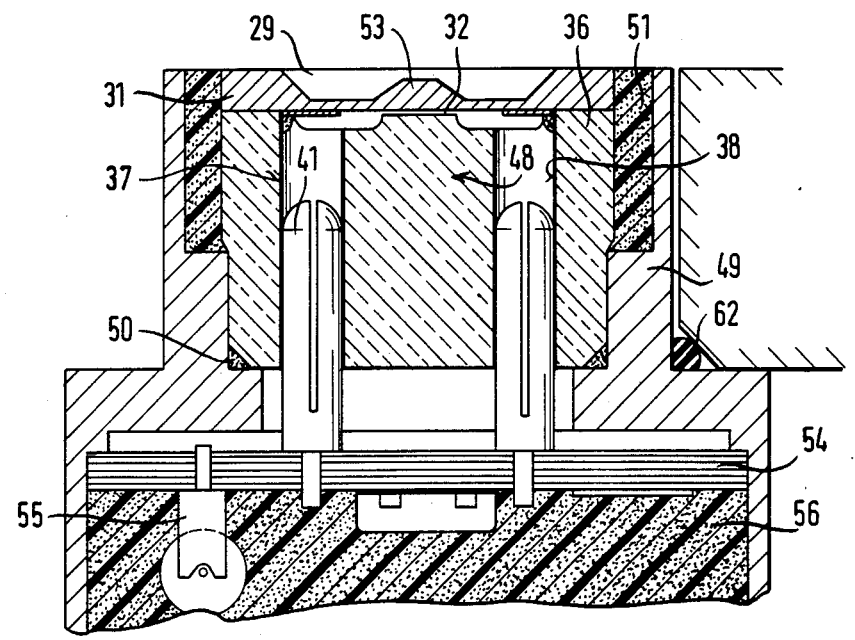
FIG. 14 is a cross-sectional view of a pressure sensor with a modified transducer insert according to the invention.

One possible type of installation is shown in FIGS. 14 and 15. The transducer insert, marked 48, is secured, and sealed, in a sensor housing 49 by a mastic 50 and a encapsulation compound 51. An O-ring 62, for example, is provided in a suitable manner to prevent the pressure medium from escaping through the sensor installation opening.

It should be mentioned that semi-conductor body 31 of transducer insert 48 has a central reinforcement 53 which, however, is not absolutely necessary and is not shown in FIG. 4, for example. However, central reinforcement 53 increases the sensitivity of the sensor and the linearisation of the calibration curve.

Contact pins 41 engage in channels 37 of transducer insert 48, thereby coming into contact with the electrically conductive layers 38 of the channels. Contact pins 41 project from an electronic circuit board 54 with electronic components 55 which are also secured in the sensor housing by means of encapsulation compound 56. Therefore, the connection between transducer insert and the electronics can be made in a very simple manner.

Figure 13:
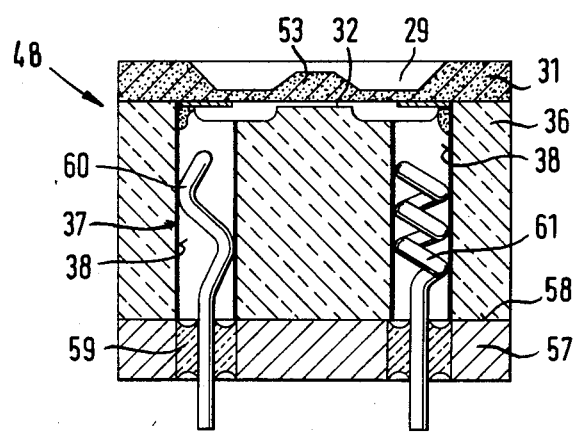
FIG. 13 is a cross-sectional view of a transducer insert according to the invention for installation in a sensor.

FIG. 13 shows a further embodiment. In this case, transducer insert 48 is attached to the top of a plate 57 by means of an adhesive bond 58. Plate 57 has insulating bushes 59 for fixing contact tabs 60 or contact coils 61 which are in contact with layers 38 of channels 37. Channels 37, metallised inside, also allow other contacts, such as, for example, soldered or glued wires, threaded connections, etc. Assembly work can be saved thanks to the channel layers according to the invention. The contacts are also more reliable as they are less sensitive to vibration. In addition, the transitional resistances are considerably smaller.

The invention has been described above on the basis of preferred embodiments. However, it is understood that it is not limited to these but also includes such modifications available to the expert on the basis of the lesson given. The so-called corner drop method described not only includes glueing, soldering, thermo-compression, but also all other connection methods not expressly mentioned, such as, for example, welding or brazing, with the same or similar effects. Further new, described and illustrated details are also covered by the invention, even if not expressly mentioned in the following patent claims.

We claim:

1. A transducer insert comprising:
   a semi-conductor body having a measuring diaphragm with force responsive sensor means for generating measuring signals, said semi-conductor body also having connecting contacts;
   a base body for holding the semi-conductor body, said base body being composed of an insulating material; and
   electrical conductor means for carrying off said measuring signals, said conductor means comprises channels which extend through said base body and are provided with electrically conductive layers, said electrically conductive layers extend close to the connecting contacts to permit associated ones of said electrically conductive layers and said connecting contacts to be electrically connected to each other through an electrically conductive material, said electrically conductive material being applied adjacent to portions of the associated ones of said conductive layers and connecting contacts in an angle space therebetween.

2. Transducer insert in accordance with claim 1, in which the axes of said channels extend essentially at right angles to the joining plane between the semi-conductor body and the base body.

3. Transducer insert in accordance with claim 1, in which at least a portion of each of said electrically conductive layers near to said connecting contact is essentially at right angles thereto.

4. Transducer insert in accordance with claim 1, in which a recess is provided in the base body underneath the measuring diaphragm and in which the electrically conductive layers comprise extensions in the form of conductive tabs extending along the peripheral wall of the recess to the connecting contacts.

5. Transducer insert in accordance with claim 4, in which the recess has a central projection with which the measuring diaphragm is adapted to come into contact when a certain amount of deflection of the measuring diaphragm is exceeded.

6. Transducer insert in accordance with claim 5, in which the measuring diaphragm has a central portion of increased thickness.

7. Transducer insert in accordance with claim 6, in which the measuring diaphragm is formed by a recess in the semi-conductor body on the side opposite the side provided with said sensor means and connecting contacts.

8. Transducer insert in accordance with claim 1, in which the semi-conductor body comprises a silicon material and the base body comprises a glass material.

9. Transducer insert in accordance with claim 1, in which the semi-conductor body is anodically mounted to the base body.

10. A transducer insert comprising:
    a semi-conductor body having a measuring diaphragm with at least one of a force capacitor plate and diffused-in resistance path means for generating measuring signals, said semi-conductor body having connecting contacts outside the measuring diaphragm;
    a base body for holding the semi-conductor body, said base body being composed of an insulating material and including a recess having a peripheral wall beneath the measuring diaphragm; and
    electrical conductor means for carrying off the measuring signals, said electrical conductor means comprising a plurality of channels which extend through said base body, each channel being provided with electrically conductive layers and having a conductive tab-like extension, each tab-like extension extends between the peripheral wall of the recess to a location near one of the connecting contacts and forms an angle space therebetween, said tab-like extensions each being electrically connected to the associated one of the connecting contacts through a drop-like amount of electrically conductive material located in the angle space.

11. Method for manufacturing a semi-conductor transducer insert comprising the steps of:
   (a) providing a plate of semi-conductor material having a plurality of measuring diaphragm portions formed therein each measuring diaphragm portion comprises a measuring diaphragm having force responsive sensor means and connecting contacts,
   (b) incorporating channels in a base plate of an insulating material in an arrangement and number corresponding to the connecting contacts of the diaphragm portions of the semi-conductor plate;
   (c) coating the channels of the base plate with an electrically conductive material;
   (d) connecting the semi-conductor plate to the base plate such that to each of the channels is associated a connecting contact of the diaphragm portions;
   (e) connecting the electrically conductive layers of the channels to the connecting contacts of the diaphragm portions by causing an electrically conductive material to adhere to adjacent portions of the conductive layers and connecting contacts; and
   (f) dividing the wafer arrangement comprising the base plate and the semi-conductor plate into a number of individual transducer inserts each having a diaphragm with force responsive sensor means and means for carrying off a measuring signal produced thereby.

12. Method in accordance with claim 11, in which prior to the step of connecting the base and semi-conductor plates recesses in a number and arrangement corresponding to the diaphragms of the semi-conductor plate are formed in the base plate.

13. Method in accordance with claim 12, in which in a first step the recesses are formed to an intermediate depth d and then to a full depth T except for a central area whereby a central raised area of depth d is provided in each recess.

14. Method in accordance with claim 11, in which the step of connecting the electrically conductive layers of the channels to the connecting contacts comprises the steps of introducing a thermo-compression tool into the channel, removing material from the electrically conductive layer of the channel, pressing the material removed into the vicinity of the connecting contact, plastifying the removed material and causing it to adhere to the layer and connecting contact.

15. Method in accordance with claim 14, in which the material removed is a metal deposition on the electrically conductive layer near the connecting contact.

16. Method in accordance with claim 11, in which the step of connecting the electrically conductive layers of the channels to the connecting contacts comprises the steps of providing a soldering material on the electrically conductive layer near the connecting contact, melting the soldering material and causing it to adhere to the connecting contact by means of a soldering tool introudced into the channel.

17. Method in accordance with claim 11, in which the step of connecting the electrically conductive layers of the channels to the connecting contacts comprises the steps of introducing a dispensing tool for an electrically conductive adhesive into the channel, applying the adhesive to adjacent portions of the connecting contact and electrically conductive layer, and allowing the adhesive to set.

18. Method in accordance with claim 11, in which a number of connections between the electrically conductive layers and the connecting contacts are simultaneously made by means of multiple tool.

19. A sensor having a transducer insert comprising:
   a semi-conductor body having a measuring diaphragm with a force responsive sensor means for generating measuring signals, said semi-conductor body also having connecting contacts;
   a base body for holding the semi-conductor body, said base body being composed of an insulating material; and
   electrical conductor means for carrying off the measuring signals, said conductor means comprises channels which extend through said base body and are provided with electrically conductive layers extending close to the connecting contacts to permit associated ones of said electrically conductive layers and said connecting contacts to be electrically connected to each other through an electrically conductive material, said electrically conductive material being applied to adjacent portions of associated conductive layers and connecting contacts in an angle space therebetween, said sensor means having a housing which accommodates the transducer insert and having a carrier plate, said carrier plate having contact elements which are capable of being inserted into the channels.

* * * * *